A. A. KRAMER.
TANK CONSTRUCTION.
APPLICATION FILED DEC. 22, 1919.
1,373,434.
Fig. IV.
Patented Apr. 5, 1921.
2 SHEETS—SHEET 2.
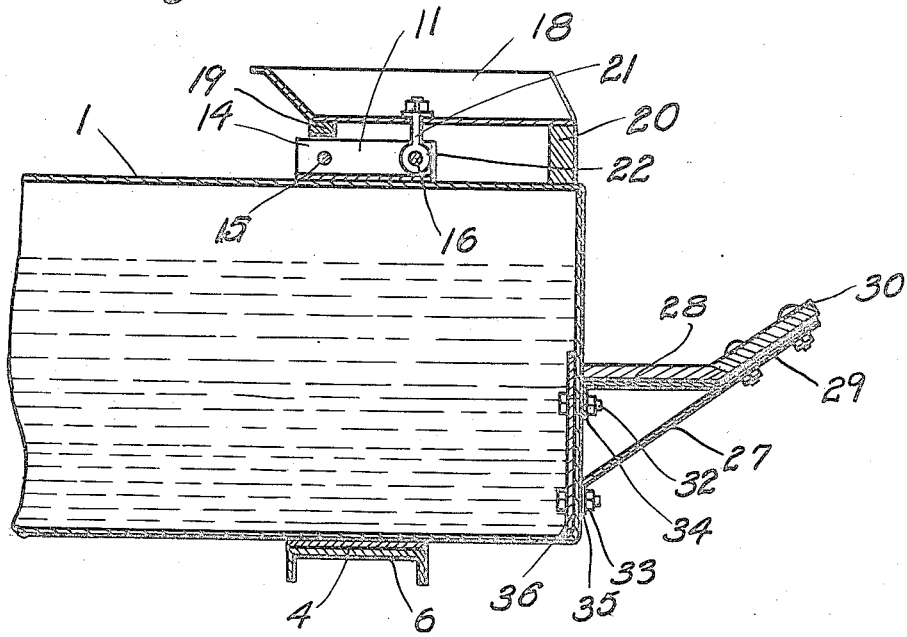
Fig. V.
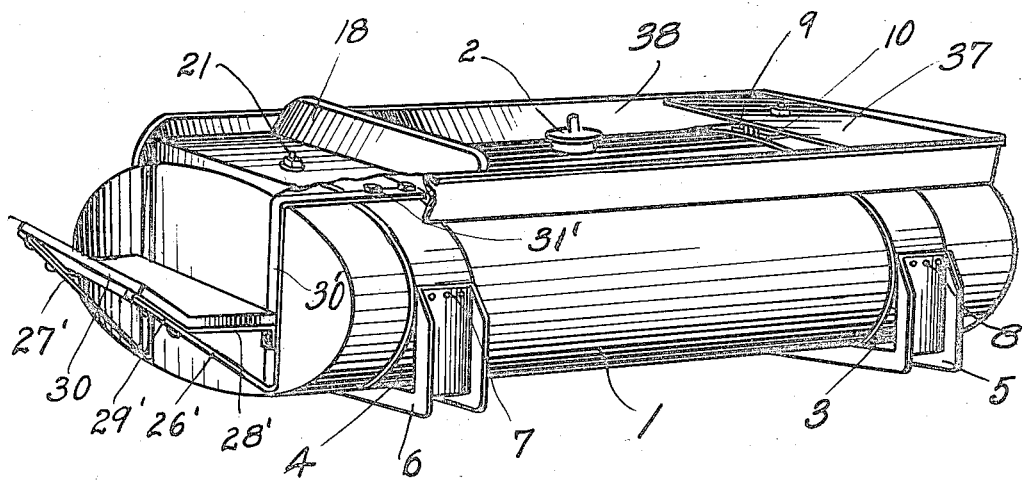
INVENTOR
Andrew. A. Kramer.
BY
ATTORNEY

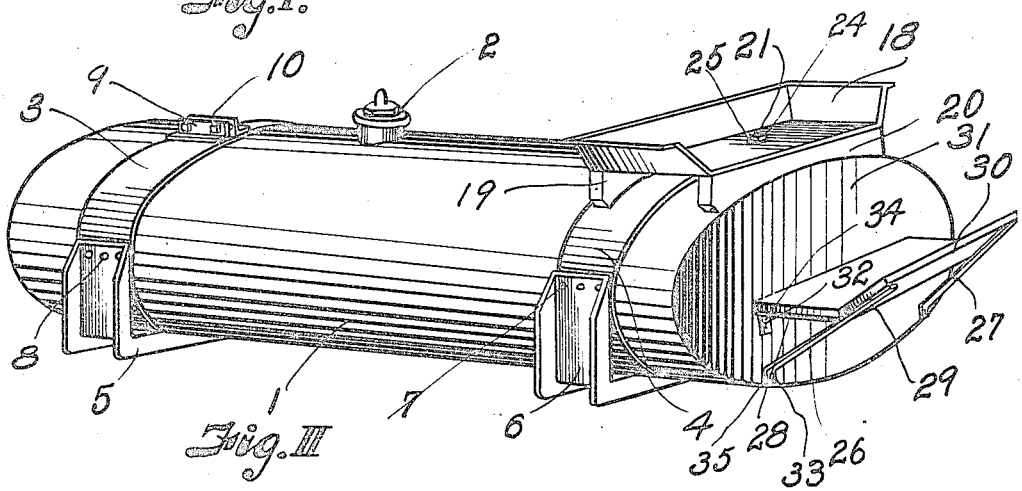
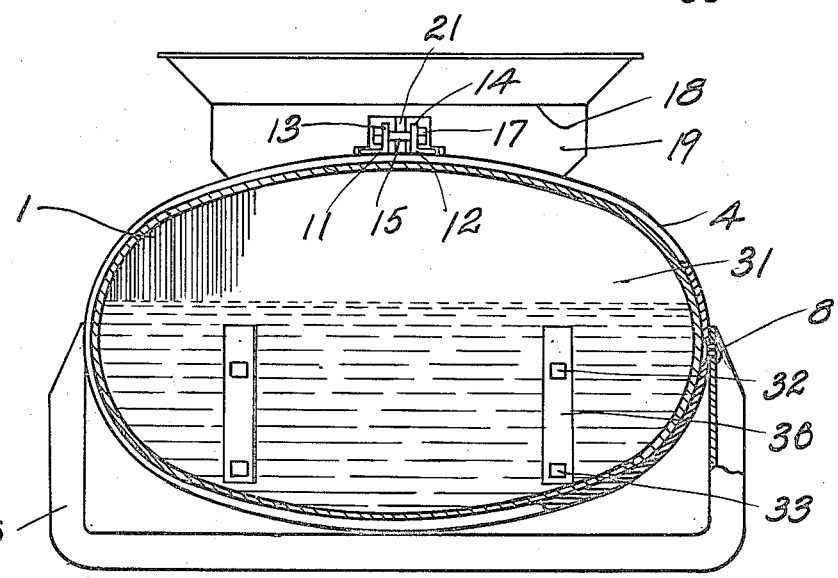
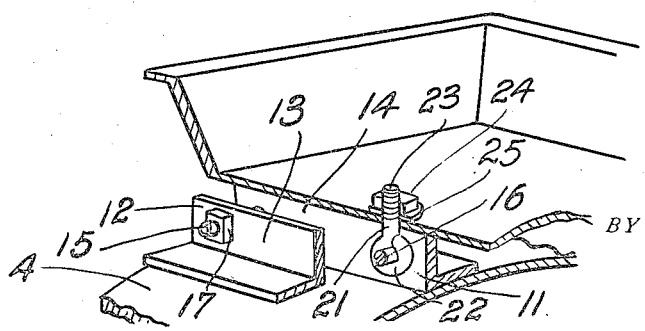

UNITED STATES PATENT OFFICE.

ANDREW A. KRAMER, OF KANSAS CITY, MISSOURI.

TANK CONSTRUCTION.

1,373,434. Specification of Letters Patent. Patented Apr. 5, 1921.

Application filed December 22, 1919. Serial No. 346,713.

*To all whom it may concern:*

Be it known that I, ANDREW A. KRAMER, a citizen of the United States, residing at Kansas City, in the county of Jackson and State of Missouri, have invented certain new and useful Improvements in Tank Constructions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tanks and particularly to portable tanks usually carried on the body of a vehicle.

The invention contemplates the provision of means whereby the tank may be suitably supported upon a vehicle body and a novel means is provided for supporting the seat for the operator and the foot rest so that the tank, the seat and the foot rest, as well as the bolsters, constitute substantially a uniform structure.

In the drawings,

Figure I is a perspective view of a tank constructed in accordance with my invention.

Fig. II is a cross sectional view through the same.

Fig. III is a fragmentary perspective view of a seat and its attaching means.

Fig. IV is a vertical, longitudinal, sectional view through the tank, and

Fig. V is a perspective view of a slightly modified form of tank.

Referring now to the drawings by numerals of reference:

1 designates a tank having a filler opening 2, the tank being provided with bands 3 and 4 which encircle the same and to which are preferably riveted the transoms 5 and 6 comprising channel members with bent-up ends secured to the bands, as at 7 and 8, and at the uppermost point on the tank are angle irons 9 and 10 for the band 3, and 11 and 12 for the band 4. The angle irons are provided with upstanding flanges 13 and 14 through which project laterally extending bolts or pins 15 and 16, secured therein preferably by nuts 17, and said flanges and bolts are adapted to support certain essential elements upon the top of the tank. For example, in Fig. II I have shown a seat 18 having the saddles 19 and 20 adapted to rest upon the tank and band, and said seat is held rigidly with respect to said tank by an anchor, shown as an eye bolt 21, the eye 22 being adapted to engage the bolt or cross rod 16. The threaded portion 23 of said eye bolt is adapted to extend through the seat bottom and receive a nut 24, preferably screwed on the threaded portion 13 to bind the washer 25 against the seat bottom and hold the seat in place, it being only necessary to use a single eye bolt for this purpose.

The foot rest or step is supported upon brackets 26 and 27 which preferably consist of straps bent intermediate their ends to provide lateral foot-supporting board rests 28 and outstanding portions 29 to support the board 30. The ends of the brackets aline and are adapted to be secured against the front end 31 of the tank by means of bolts 32 and 33, which extend through the portions 34 and 35 of the brackets and through the cleat plates or anchors 36 on the inside of the tank. The heads of the bolts bear against the cleat plates or anchors and extend through the end 31 of the tank and through the ends of the brackets and when the nuts are drawn tight thereagainst, the cleat plates will bind against the end of the tank and prevent leakage through the bolt holes, although packing or gaskets may be employed if desired.

In Fig. V I have shown a slightly modified form of tank construction in which the step support is not only secured to the end of the tank but is also supported from the band or ring 4. In this form of step support, the lateral foot board supporting rests 28′ are provided with outstanding portions 29′ to support the foot board 30 and being bent back to form brackets 26′ and 27′ having upstanding straps or extensions 30′ with right angular projections resting upon the band 4 and secured thereto by the fastening devices 31′. Therefore, the band 4 not only serves as a reinforcement for the tank but constitutes a seat support, a foot board anchor and an anchorage for the bolster.

The angle irons 9 and 10 in the construction shown in Fig. V support a rear board 37 in substantially the same manner as the seat 18 is supported and in this construction a rail 38 may be provided along the sides and at one end of the tank, although this may be omitted if desired.

From the foregoing it will be observed that the tank can be readily constructed so that the seat, the foot board support and all the essential parts of the tank may be combined in a single unitary structure so as to reduce the cost of construction and simplify the manufacture of the tank.

What I claim and desire to secure by Letters-Patent is:

1. In a tank construction, a tank, a band about the tank, a seat on the tank, and means for securing the seat to the band.

2. In a tank construction, a tank, a band about the tank, a seat on the tank, and a single anchoring device for securing the seat to the tank.

3. In a tank construction, a tank, a band about the tank, angles carried by the band, a seat, and an anchor carried by the angles and removably engaging the seat.

4. In a tank construction, a tank, a band about the tank, angles carried by the band, a seat, and an anchor comprising an eyebolt carried by the angles and removably engaging the seat.

5. In a tank construction, a tank, a band about the tank, upstanding flanges carried by the band, a seat, a bolt carried by and extending across the flanges, and an eyebolt carried by the cross bolt and removably engaging the seat.

6. In a tank construction, a tank, a band about the tank, a seat on the tank, means for securing the seat to the band, a foot board support, means for securing the foot board support to the band, and a bolster beneath the tank and having upwardly extending portions connected to the band.

In testimony whereof I affix my signature.

ANDREW A. KRAMER.